(No Model.)
W. DIEBEL.
BELT SHIFTING DEVICE.
No. 300,579. Patented June 17, 1884.
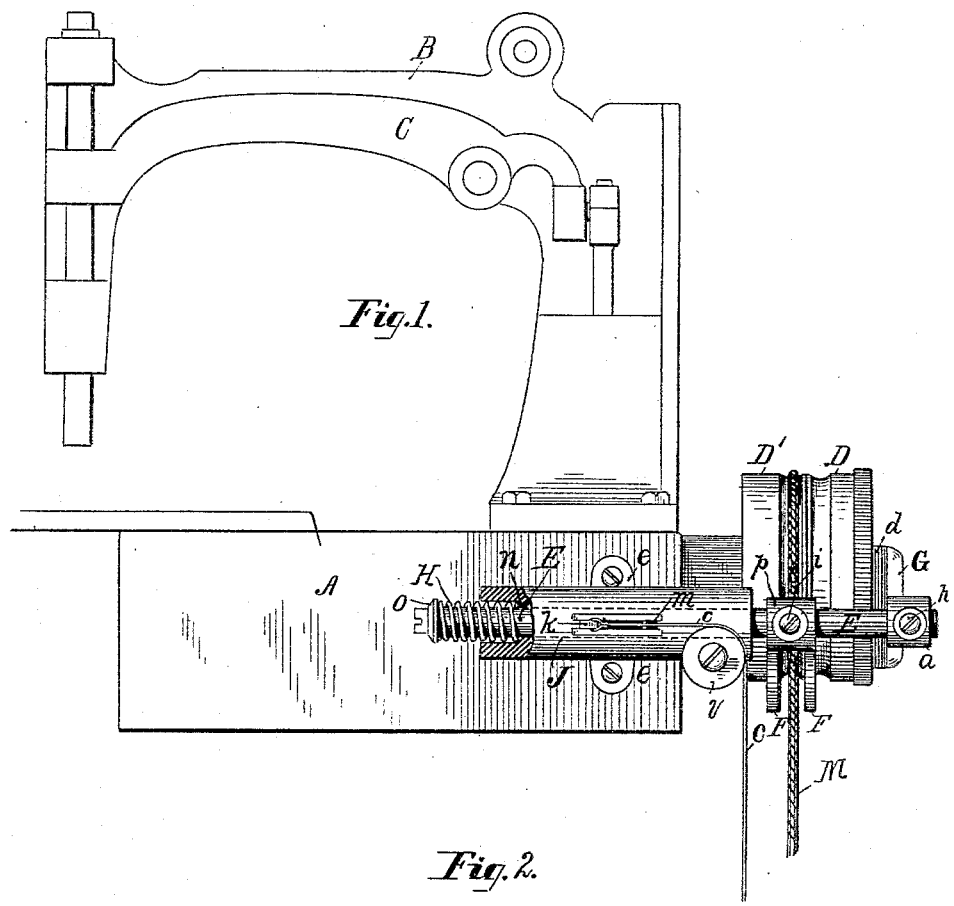
WITNESSES:
Charles F. Ziegler
J. Walter Douglass
INVENTOR
William Diebel

UNITED STATES PATENT OFFICE.

WILLIAM DIEBEL, OF PHILADELPHIA, PENNSYLVANIA.

BELT-SHIFTING DEVICE.

SPECIFICATION forming part of Letters Patent No. 300,579, dated June 17, 1884.

Application filed May 13, 1884. (No model.)

*To all whom it may concern:*

Be it known that I, WILLIAM DIEBEL, of the city and county of Philadelphia, in the State of Pennsylvania, have invented certain new and useful Improvements in Belt-Shifting Devices for Sewing-Machines.

The following is a specification of my said improvements, reference being had to the accompanying drawings, wherein—

Figure 1 is a front elevation of a portion of a sewing-machine having the improvements applied thereto, and Fig. 2 is an end view of the driving-pulley and adjacent parts.

Heretofore it has been customary to arrange such belt-shifting devices as have been used upon a separate stand. The sewing-machine had been either mounted upon a table adjacent thereto or secured upon said stand, and as no means of adjusting the shifter have been provided difficulty has been experienced in adapting the shifter to machines of different builds and sizes, and in compensating for wear or other change in a machine for which it was originally fitted.

The object of my invention is to provide a combined belt-shifter and brake which can be mounted upon the bed-plate of any sewing-machine, and capable of adjustment to meet the requirements of use without detachment from its regular position.

In the accompanying drawings, A represents the bed-plate or base of an ordinary sewing-machine, the frame B and needle-arm C of which are merely indicated in outline, as they and other features of the stitch-forming mechanism form no part of my invention, and are well understood.

D is the fast or driving pulley of the machine, and D' the loose pulley running free on the driving-shaft L.

I secure to the side of the bed-plate A a tubular sheath, J, by means of screws passing through lugs $e$, cast upon said tube. An internal shoulder, $n$, is formed near one end of the tube J, as indicated in the sectional portion, Fig. 1, and a longitudinal slot, $m$, is provided near the center. A cylindrical spindle, E, fits snugly within the tube J, and is surrounded at one end by the spiral spring H, abutting against the shoulder $n$, and the screw-cap $o$ upon the end of the spindle. A pin, $k$, is secured to the spindle E, so as to protrude through the slot $m$ of the tube J, said pin having an eye for attachment of the cord $c$, which passes over a pulley, $v$, and thence descends to a treadle or other device for conveniently moving the cord. The shifting-fingers F F, which embrace the driving-belt M, are attached to a collar, $p$, which slides freely upon the spindle E, but is provided with a set-screw, $i$, by means of which it may be secured in any desired position. A similar collar, $a$, carries the brake G, being provided with a set-screw, $h$, for securing it in the same way as the collar $p$. A pad, $d$, of leather, is attached by screws $r$ to that face of the brake G which is adjacent to the driving-pulley D.

The operation of the device is as follows: The collar $a$ is so adjusted upon the spindle E as that the pressure of the spring H shall normally hold the brake-pad $d$ against the driving-pulley D, and the collar $p$ is adjusted so that the fingers F F shall normally hold the belt M upon the loose pulley D'. When the cord $c$ is pulled down by the operator, the spindle E is moved by means of the pin $k$, so as to simultaneously shift the belt M onto the driving-pulley and to relieve the latter from the brake, thus running the machine. As soon, however, as the tension upon the cord $c$ is removed, the spring H causes the spindle to fly back to its original position, carrying with it the belt M onto the loose pulley D', and applying the brake to the driving-pulley D, so as to instantly stop the machine.

The adjustability of the collars $p$ and $a$ permits the device to be used upon machines of varying builds and sizes and to be adapted to any variation consequent upon the wear of the machine.

I am aware that the use of a tube containing a spindle and spring in combination with a belt-shifter is not new; but such devices have not, I believe, been capable of adjustment as in my invention, and, furthermore, they have been always mounted upon a separate stand or table, which cumbersome arrangement I entirely avoid.

Having thus described my invention, what I claim as new, and desire to secure by Letters Patent, is—

The combination, with the bed-plate A, of the tube J, mounted directly thereon, and having an internal shoulder, n, and slot m, the spindle E, and spring H, arranged within said tube, and the collars p and a, respectively, carrying the shifting-fingers and brake, and suitable means for securing said collars upon said spindle, the whole arranged and operating substantially as set forth.

WILLIAM DIEBEL.

Witnesses:
CHARLES F. ZIEGLER,
J. WALTER DOUGLASS.